US012124206B2

(12) United States Patent
Saito et al.

(10) Patent No.: US 12,124,206 B2
(45) Date of Patent: Oct. 22, 2024

(54) POWDER COLLECTION CONTAINER AND IMAGE FORMING APPARATUS

(71) Applicants: Osamu Saito, Kanagawa (JP); Tomonori Tamura, Kanagawa (JP)

(72) Inventors: Osamu Saito, Kanagawa (JP); Tomonori Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/195,939

(22) Filed: May 11, 2023

(65) Prior Publication Data

US 2023/0367256 A1 Nov. 16, 2023

(30) Foreign Application Priority Data

May 12, 2022 (JP) ................................ 2022-078666

(51) Int. Cl.
*G03G 21/12* (2006.01)
*G03G 21/10* (2006.01)

(52) U.S. Cl.
CPC ........... *G03G 21/12* (2013.01); *G03G 21/105* (2013.01)

(58) Field of Classification Search
CPC ............................ G03G 21/12; G03G 21/105
See application file for complete search history.

(56) References Cited

U.S. PATENT DOCUMENTS 9,494,907 B2 * 11/2016 Mizutani .............. G03G 21/105
2006/0120779 A1 * 6/2006 Uchihashi .............. G03G 21/12 399/358
2009/0169265 A1 7/2009 Yoshida et al.
2013/0216289 A1 * 8/2013 Tojo ..................... G03G 21/105 399/360
2020/0166886 A1 5/2020 Saito et al.
2021/0200138 A1 * 7/2021 Oh ....................... G03G 21/105

FOREIGN PATENT DOCUMENTS

JP 2012-042789 3/2012
JP 2015-022199 2/2015

* cited by examiner

*Primary Examiner* — Sandra Brase
(74) *Attorney, Agent, or Firm* — XSENSUS LLP

(57) ABSTRACT

A powder collection container includes a container body, a conveying screw, a shaft portion, and a screw portion. The container body has a collection port from which powder is to flows into the container body. The conveying screw includes a shaft portion and a screw portion. The shaft portion extends in an axial direction of the conveying screw. The screw portion is wound around the shaft portion. The conveying screw rotates in a specified direction to convey the powder, which has flowed into the container body, toward an end of the conveying screw in the axial direction. The conveying screw includes a non-screw portion around which no screw portion is wound at least one position of the shaft portion between the collection port and the end of the conveying screw in the axial direction.

6 Claims, 5 Drawing Sheets

POWDER COLLECTION CONTAINER AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-078666, filed on May 12, 2022, in the Japan Patent Office, the entire disclosure of which is hereby incorporated by reference herein.

BACKGROUND

Technical Field

Embodiments of the present disclosure relate to a powder collection container that collects powder such as waste toner, and an image forming apparatus such as a copier, a printer, a facsimile, or a multifunction peripheral thereof including the powder collection container.

Related Art

Image forming apparatuses such as a copier or a printer are widely known that include a powder collection container such as a waste-toner collection container. In such a powder collection container, a conveying screw is often employed to convey powder entering from a collection port in an axial direction of the conveying screw.

SUMMARY

In an embodiment of the present disclosure, there is provided a powder collection container that includes a container body, a conveying screw, a shaft portion, and a screw portion. The container body has a collection port from which powder is to flows into the container body. The conveying screw includes a shaft portion and a screw portion. The shaft portion extends in an axial direction of the conveying screw. The screw portion is wound around the shaft portion. The conveying screw rotates in a specified direction to convey the powder, which has flowed into the container body, toward an end of the conveying screw in the axial direction. The conveying screw includes a non-screw portion around which no screw portion is wound at least one position of the shaft portion between the collection port and the end of the conveying screw in the axial direction.

In another embodiment of the present disclosure, there is provided an image forming apparatus that includes the powder collection container.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
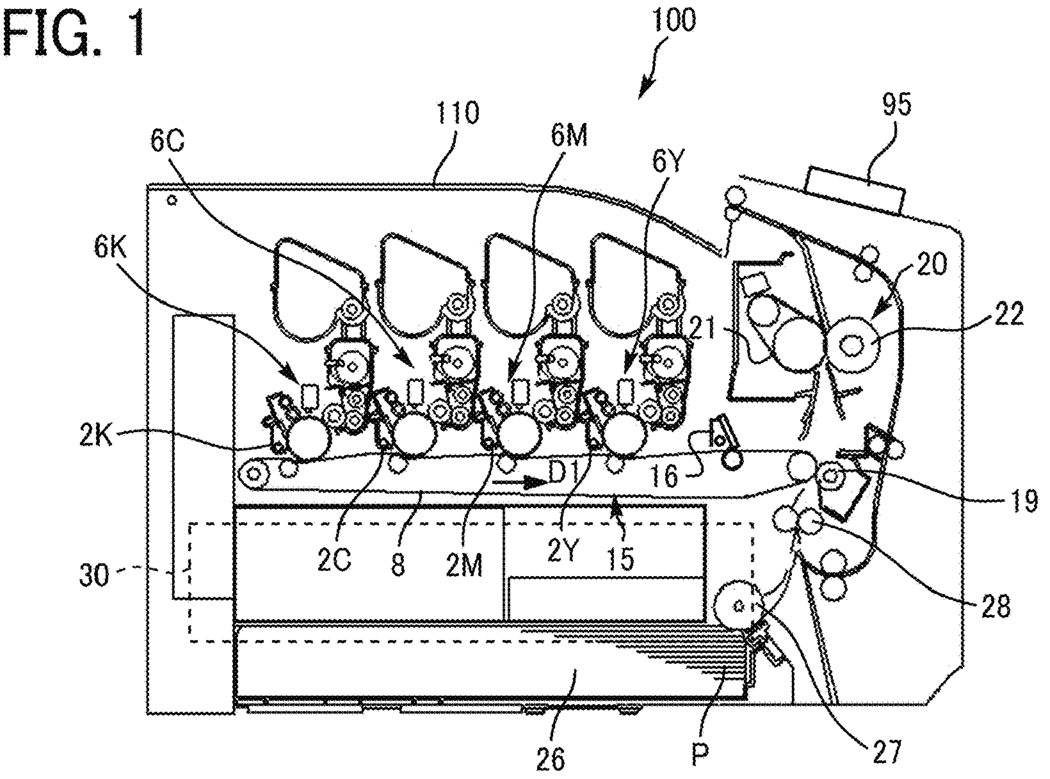
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, embodiments of the present disclosure are described in detail below. Identical reference numerals are assigned to identical components or equivalents and descriptions of those components may be simplified or omitted.

Figure 2:
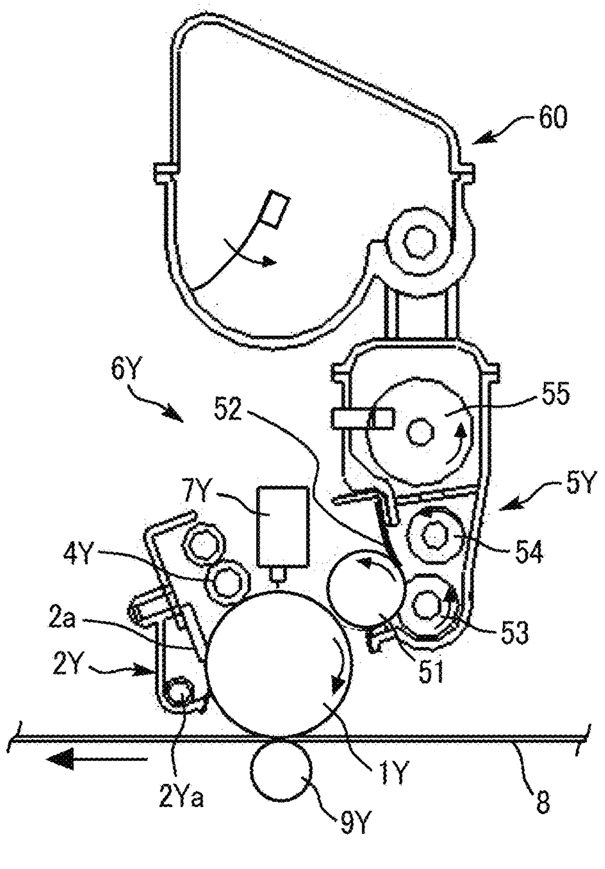
FIG. 2 is a schematic view of a process cartridge of the image forming apparatus illustrated in FIG. 1, and a surrounding structure of the process cartridge.

Initially with reference to FIGS. 1 and 2, a description is given of the overall configuration and operation of an image forming apparatus 100 according to an embodiment of the present disclosure. As illustrated in FIG. 1, an intermediate transfer belt device 15 is disposed in the middle of a body of the image forming apparatus 100. Process cartridges 6Y, 6M, 6C, and 6K corresponding to different colors of yellow, magenta, cyan, and black, respectively, are arranged in parallel to face an intermediate transfer belt 8 of the intermediate transfer belt device 15. Below the intermediate transfer belt device 15, a waste-toner collection container 30 serving as a powder collection container is disposed. In the waste-toner collection container 30, untransferred toner collected in cleaning devices 2Y, 2M, 2C, 2K, and 16 in an image forming operation is collected as waste toner (powder) via a waste-toner conveyor 40 (see FIG. 3).

With reference to FIG. 2, the process cartridge 6Y corresponding to yellow includes a photoconductor drum 1Y serving as an image bearer, and a charging device 4Y (charging roller), a developing device 5Y, and the cleaning device 2Y disposed around the photoconductor drum 1Y, which are attachable to and detachable (replaceable) from the body of the image forming apparatus 100 as one unit. A series of image forming processes including charging, exposure, developing, primary transfer, and cleaning processes is performed on the photoconductor drum 1Y. Accordingly, a yellow image is formed on the surface of the photoconductor drum 1Y. The process cartridge 6Y and a primary transfer roller 9Y (primary transfer device) together serve as an image forming device.

Note that other process cartridges 6M, 6C, and 6K (as image forming devices) have a similar configuration to that of the yellow process cartridge 6Y except the color of toner used therein and form magenta, cyan, and black toner images, respectively. Thus, only the process cartridge 6Y is described below and descriptions of other process cartridges 6M, 6C, and 6K may be omitted.

With reference to FIG. 2, the photoconductor drum 1Y is rotated clockwise by a main motor. At a position where the photoconductor drum 1Y opposes the charging device 4Y (charging roller), the charging device 4Y uniformly charges the surface of the photoconductor drum 1Y (a charging process). When the surface of the photoconductor drum 1Y reaches a position at which the surface of the photoconductor drum 1Y is irradiated with exposure light emitted from an exposure device 7Y (e.g., an optical writing head), the photoconductor drum 1Y is scanned with the laser beam L. Thus, an electrostatic latent image corresponding to yellow is formed on the photoconductor drum 1Y (an exposure process).

When the surface of the photoconductor drum 1Y reaches a position facing the developing device 5Y, at the position, the electrostatic latent image is developed with the toner into a yellow toner image (a development process). When the surface of the photoconductor drum 1Y bearing the toner image reaches a position facing the primary transfer roller 9Y via the intermediate transfer belt 8, at the position, the toner image on the photoconductor drum 1Y is transferred onto the intermediate transfer belt 8 (a primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1 Y into the cleaning device 2Y (a cleaning process). Note that the untransferred toner collected in the cleaning device 2Y is conveyed to the front side in a direction perpendicular to the plane on which FIGS. 1 and 2 are illustrated by a conveying coil 2Ya, and then passes through the waste-toner conveyor 40 (conveyance passage) to be stored (collected) as the waste toner in the waste-toner collection container 30 (see FIG. 3) as a powder collection container. Finally, the surface of the photoconductor drum 1Y reaches a position facing a charge neutralizer, and the charge neutralizer removes residual potentials from the photoconductor drum 1Y. Thus, a series of image forming processes performed on the surface of the photoconductor drum 1Y is completed.

The above-described image forming processes are performed in the process cartridges 6M, 6C, and 6K (serving as image forming devices) similarly to the yellow process cartridge 6Y (serving as an image forming device). More specifically, the exposure light based on image data is emitted from exposure devices 7 disposed in an upper area of the image forming apparatus 100 onto photoconductor drums 1M, 1C, and 1K of the process cartridges 6M, 6C, and 6K. Then, the toner images formed on the photoconductor drums 1M, IC, and 1K through the development process are transferred and superimposed on the intermediate transfer belt 8. Thus, a color image is formed on the intermediate transfer belt 8.

With reference to FIG. 1, the intermediate transfer belt device 15 includes, for example, the intermediate transfer belt 8, four primary transfer rollers 9 (see, e.g., the primary transfer roller 9Y in FIG. 2), a drive roller, and a driven roller. The intermediate transfer belt 8 is stretched and supported by the drive roller, the driven roller, and the primary transfer rollers and is endlessly moved in a direction indicated by arrow DI (counterclockwise direction) in FIG. 1 by rotational driving of the driving roller.

The primary transfer roller 9Y nips the intermediate transfer belt 8 between the photoconductor drum 1Y and the primary transfer roller 9Y to form a primary transfer nip. A transfer voltage (a primary transfer bias) opposite in polarity to toner is applied to the primary transfer roller 9Y. The intermediate transfer belt 8 travels in the direction indicated by arrow D1 in FIG. 1 and sequentially passes through the primary transfer nips of the primary transfer rollers (including the primary transfer roller 9Y). Accordingly, the toner images of the respective colors on the photoconductor drums 1 (including the photoconductor drum 1Y) are primarily transferred and superimposed one on another onto the intermediate transfer belt 8.

Then, the intermediate transfer belt 8 onto which the toner images of the respective colors are transferred in a superimposed manner reaches a position facing a secondary transfer roller 19 (a secondary transfer device). At this position, the intermediate transfer belt 8 is nipped between the drive roller (as a secondary transfer counter roller) and the secondary transfer roller 19 to form a secondary transfer nip. The toner images of four colors formed on the intermediate transfer belt 8 are transferred onto a sheet P such as a sheet of paper conveyed to the position of the secondary transfer nip (a secondary transfer process). At this time, the untransferred toner that has not been transferred onto the sheet P remains on the surface of the intermediate transfer belt 8.

The surface of the intermediate transfer belt 8 then reaches a position opposite the cleaning device 16 for the intermediate transfer belt 8. At this position, the untransferred toner on the intermediate transfer belt 8 is mechanically removed by an intermediate transfer cleaning blade pressed against the intermediate transfer belt 8. In the present embodiment, the intermediate transfer cleaning blade is a substantially plate-shaped member formed of an elastic material such as urethane rubber, and is in contact with the intermediate transfer belt 8 at a specified contact pressure and a specified contact angle. Note that the untransferred toner collected in the cleaning device 16 for the intermediate transfer belt 8 is also conveyed to the front side in a direction perpendicular to the plane on which FIGS. 1 and 2 are illustrated by a conveying coil in the same manner as the untransferred toner collected in the cleaning devices 2Y, 2M, 2C, and 2K, and is then collected as the waste toner (powder) in the waste-toner collection container 30 (see FIG. 3) via the waste-toner conveyor 40. The waste-toner collection container 30 (powder collection container) is described in detail below with reference to FIGS. 3 to 9. As a result, a series of transfer processes executed on the outer circumferential surface of the intermediate transfer belt 8 is completed.

Referring to FIG. 1, the sheet P conveyed to the position of the secondary transfer nip is conveyed from a sheet feeder 26 disposed below the body of the image forming apparatus 100 via, for example, a feed roller 27 and a registration roller pair 28 (timing roller pair). Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

As the registration roller pair 28 stops rotating temporarily, the leading end of the sheet P stops moving at the roller nip of the registration roller pair 28. Rotation of the registration roller pair 28 is timed to convey the sheet P toward the secondary transfer nip such that the sheet P meets the color image on the intermediate transfer belt 8 at the secondary transfer nip. Thus, the desired color image is transferred onto the sheet P.

Subsequently, the sheet P, onto which the color image has been transferred at the secondary transfer nip, is conveyed to the position (fixing nip) of a fixing device 20. At this position, the color image (toner image) transferred onto the surface of the sheet P is fixed onto the sheet P by heat and pressure from a fixing belt 21 serving as a fixing member and a pressure roller 22 serving as a pressure member (a fixing step). The sheet P is ejected by an ejection roller pair to the outside of the image forming apparatus 100. The sheet P ejected to the outside of the image forming apparatus 100 by the ejection roller pair is sequentially stacked on a stack portion (e.g., an exterior cover 110) as an output image. Thus, a series of image forming processes performed by the image forming apparatus 100 is completed.

Next, a description is given of image forming devices in the image forming apparatus in detail below with reference to FIG. 2. As illustrated in FIG. 2, the process cartridge 6Y includes, for example, the photoconductor drum 1Y (image bearer), the charging device 4Y (charging roller), the developing device 5Y, and the cleaning device 2Y. The photoconductor drum 1Y as an image bearer is a negatively-charged organic photoconductor and is driven to rotate clockwise in FIG. 2 by a main motor disposed in the body of the image forming apparatus 100.

The charging device 4Y (charging roller) is an elastic charging roller and includes a core and an elastic layer of moderate resistivity, covering the core. For example, the elastic layer is a foamed urethane layer that includes urethane resin, carbon black as conductive particles, a sulfuration agent, and a foaming agent. The cleaning device 2Y includes the cleaning blade 2*a* that slidingly contacts the photoconductor drum 1Y and mechanically removes and collects the untransferred toner from the photoconductor drum 1Y. The cleaning blade 2*a* is made of an elastic material such as urethane rubber and has a substantially plate shape. The cleaning blade 2*a* is pressed against the photoconductor drum 1Y with a specified pressure and at a specified angle.

The developing device 5Y is disposed such that a developing roller 51 as a developer bearer contacts the photoconductor drum 1Y. Thus, a developing region is formed (at a contact position) between the developing roller 51 and the photoconductor drum 1Y. In the developing device 5Y, toner as a developer (nonmagnetic or magnetic one-component developer) is stored. The developing device 5Y develops the electrostatic latent image on the photoconductor drum 1Y to form a toner image. The developing device 5Y includes the developing roller 51, a supplying roller 53, a doctor blade 52, and developer conveying screws 54 and 55. A toner container 60 for appropriately supplying fresh toner to the developing device 5Y is detachably attached to an upper portion of the developing device 5Y.

A description is given of a characteristic configuration and operation of the waste-toner collection container 30 as the powder collection container according to the present embodiment in detail below. With reference to FIG. 1, in the present embodiment, the waste-toner collection container 30 as a powder collection container is disposed below the intermediate transfer belt device 15 and on a front side of the body of the image forming apparatus 100 (a front side in a direction perpendicular to the plane on which FIG. 1 is illustrated). The waste-toner collection container 30 is a powder collection container that can collect waste toner as powder. In the present embodiment, the waste-toner collection container 30 is detachably attached to the body of the image forming apparatus 100 (or the waste-toner conveyor 40 illustrated in FIG. 3). When the inside of the waste-toner collection container 30 is full of the waste toner (when a full-state detection sensor 35 illustrated in FIG. 3 detects a state where the waste toner is at the detection position), the waste-toner collection container 30 is replaced with a new container (empty container). Specifically, in the present embodiment, when a main body door (installed on the left side in FIG. 1) of the body of the image forming apparatus 100 is open, the waste-toner collection container 30 is replaced by an operation of attachment and detachment in the width direction (the left-right direction in FIGS. 1 and 3 and the axial direction). Note that the position of the waste-toner collection container 30 and the direction in which attachment and detachment operations are performed are not limited to those of the present embodiment.

Figure 3:
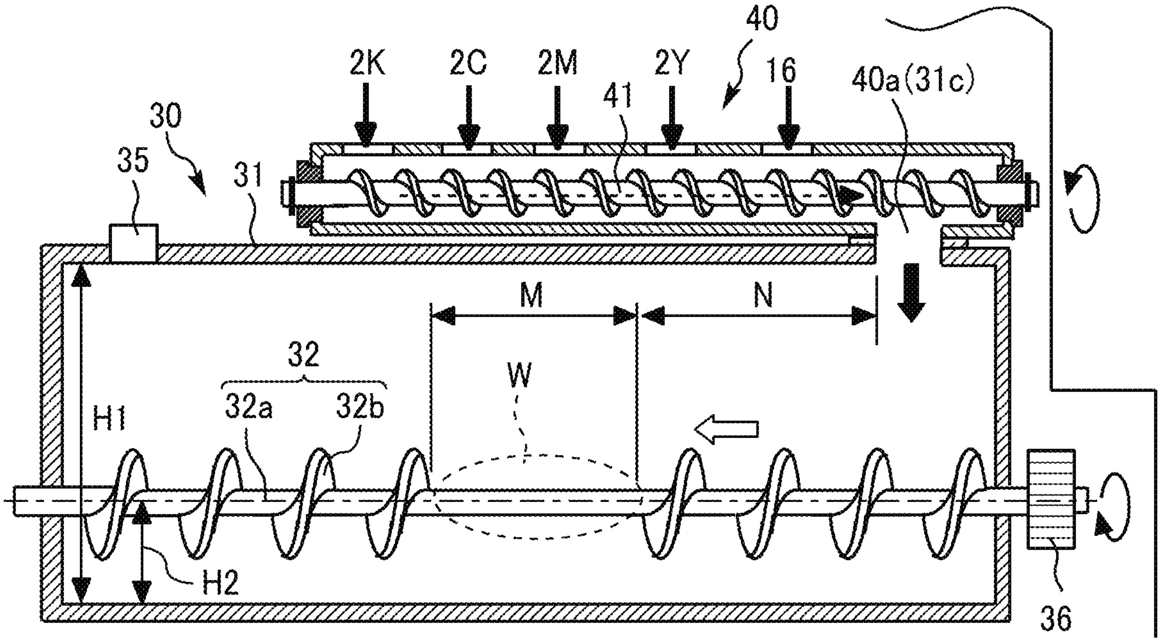
FIG. 3 is a schematic cross-sectional view of a waste-toner collection container installed in a body of the image forming apparatus illustrated in FIG. 1 in an axial direction of the waste-toner collection container.

With reference to FIG. 3, the waste-toner collection container 30 (powder collection container) is a box-shaped container formed to extend with a width direction (a left-right direction in FIGS. 3 and 4 and an axial direction of a conveying screw 32 to be described below) as a longitudinal direction. As illustrated in FIG. 3, a container body 31 as a housing of the waste-toner collection container 30 is molded into a bottle shape by, for example, blow molding, and has a substantially rectangular parallelepiped space (collection space) in the container body 31. A collection port 31*c* (opening) is formed on a ceiling surface of the container body 31. The waste-toner conveyor 40 as a conveyance passage fixed to the body of the image forming apparatus 100 is attached to and detached from the collection port 31*c* in conjunction with attachment and detachment of the waste-toner collection container 30 to and from the body of the image forming apparatus 100.

With reference to FIG. 3, the waste-toner conveyor 40 is a conveyance passage along which the untransferred toner (powder) collected by the plurality of cleaning devices is conveyed as waste toner toward the waste-toner collection container 30. A waste-toner conveying screw 41 that rotates in a specified direction to convey the waste toner from left to right in FIG. 3 is disposed in the waste-toner conveyor 40. In the waste-toner conveyor 40, an outlet port through which the untransferred toner collected in the cleaning device 2K for black is discharged is formed on the most upstream side in a conveyance direction of the waste toner. An outlet port through which the untransferred toner collected in the cleaning device 2C for cyan is discharged is formed on the downstream side of the outlet port for the cleaning device 2K. An outlet port through which the untransferred toner collected in the cleaning device 2M for magenta is discharged is formed on the downstream side of the outlet port for the cleaning device 2C. An outlet port through which the untransferred toner collected by the cleaning device 2Y for yellow is discharged is formed on the downstream side of the outlet port for the cleaning device 2M. An outlet port through which the untransferred toner collected in the cleaning device 16 for the intermediate transfer belt 8 is discharged is formed on the most downstream side in the conveyance direction of the waste toner.

In a state where a part of the waste-toner conveyor 40 (conveyance passage) is connected to the waste-toner collection container 30 via the collection port 31*c* (the state illustrated in FIG. 3), the toner (untransferred toner and waste toner) collected by the five cleaning devices 2Y, 2M, 2C, 2K, and 16 is discharged from an outlet port 40*a* of the waste-toner conveyor 40 and collected (stored) in the waste-toner collection container 30. Specifically, the untransferred toner collected by each of the five cleaning devices 2Y, 2M, 2C, 2K, and 16 is discharged from the corresponding discharge port to the waste-toner conveyor 40, is conveyed to the position of the outlet port 40*a* by the waste-toner conveying screw 41, falls by its weight in a direction indicated by a black arrow from the outlet port 40*a*, and is collected as waste toner T in the waste-toner collection container 30 (container body 31).

On the other hand, with reference to FIG. 3, the waste-toner collection container 30 is provided with the conveying screw 32 (screw) that conveys, to an end in an axial direction (left end in FIGS. 3 to 9) of the conveying screw 32, the waste toner T (powder) that has flowed into the container body 31 from the collection port 31*c*. The conveying screw 32 includes a shaft portion 32*a* and a screw portion 32*b*. The screw portion 32*b* is spirally wound around the shaft portion 32*a*. The conveying screw 32 is made of a metal material or a resin material. The conveying screw 32 is provided with a driven gear 36 (or a driven coupling) on the far side in an attachment direction (right side in FIG. 3). The driven gear 36 (or a driven coupling) meshes with a drive gear (or a drive coupling) disposed on a motor shaft of a motor (fixed to the body of the image forming apparatus 100). The conveying screw 32 is driven to rotate by receiving driving force from the motor. The waste toner T that has flowed into the container body 31 is conveyed in a direction indicated by a white arrow in FIG. 3.

More specifically, first, in the empty waste-toner collection container 30, the waste toner T that has flowed into from the collection port 31*c* is accumulated on a bottom below the collection port 31*c*. When the height of the waste toner T thus accumulated reaches the position of the conveying screw 32, the waste toner T is conveyed in the direction indicated by the white arrow by the conveying screw 32. When the waste toner T is detected by the full-state detection sensor 35 (e.g., a piezoelectric sensor) disposed at an end in the axial direction as the collection of the waste toner T progresses, an instruction prompting the user to replace the waste-toner collection container 30 is displayed on an operation display panel 95 (see FIG. 1) of the body of the image forming apparatus 100, assuming that the container body 31 is full of the waste toner T collected therein. Note that a behavior of the waste toner T from a time when the waste toner T that has flowed into the empty waste-toner collection container 30 to a time when the waste-toner collection container 30 is full is described in detail below with reference to FIGS. 4 to 9.

As described above, the waste-toner collection container 30 (powder collection container) according to the present embodiment includes the container body 31 and the conveying screw 32. The waste toner T that has flowed into from the collection port 31*c* is collected in the container body 31. The conveying screw 32 (in which the screw portion 32*b* is wound around the shaft portion 32*a* extending in the axial direction) is driven to rotate in a specified direction to convey the waste toner (powder) that has flowed into the container body 31 toward the end in the axial direction (left end in FIGS. 3 to 9). In particular, in the waste-toner collection container 30 according to the present embodiment, as illustrated in FIG. 3, the conveying screw 32 is disposed at a position separated from a ceiling surface and relatively close to a bottom surface (a position at a height H2 from the bottom surface) in the container body 31 due to layout constraints in the body of the image forming apparatus 100 or cost reasons for sharing a drive source that drives to rotate the conveying screw 32 with a drive source that drives to rotate another member (e.g., the feed roller 27).

Note that in the present embodiment, the collection port 31*c* is formed in an upper portion of one end in the axial direction (right end in FIG. 3) that is opposite the other end in the axial direction (left end in FIG. 3) in the container body 31. However, as illustrated in FIG. 3, the position of the collection port 31*c* is not limited to the position of a ceiling portion of the container body 31. The position of the collection port 31*c* may be any position where the waste toner T can flow into the container body 31, and for example, may be a position of a lateral wall close to the ceiling portion.

As illustrated in FIG. 3, the conveying screw 32 according to the present embodiment is provided with at least one non-screw portion W, around which the screw portion 32*b* is not wound, at a position of the shaft portion 32*a* between the collection port 31*c* and the end in the axial direction. Specifically, the conveying screw 32 is provided with the non-screw portion W constituted of the shaft portion 32*a* alone in a range of a length M at a position away by a distance N downstream from the collection port 31*c* in the conveyance direction of the conveying screw 32. In other words, it is not that the screw portion 32*b* is provided for (wound around) the entire area of the conveying screw 32 in the axial direction of the conveying screw 32 in the container body 31. The non-screw portion W is provided for a part of the conveying screw 32 in the axial direction (downstream from the collection port 31*c* in the conveyance direction and upstream from an inner wall at the downstream end).

Figure 7:
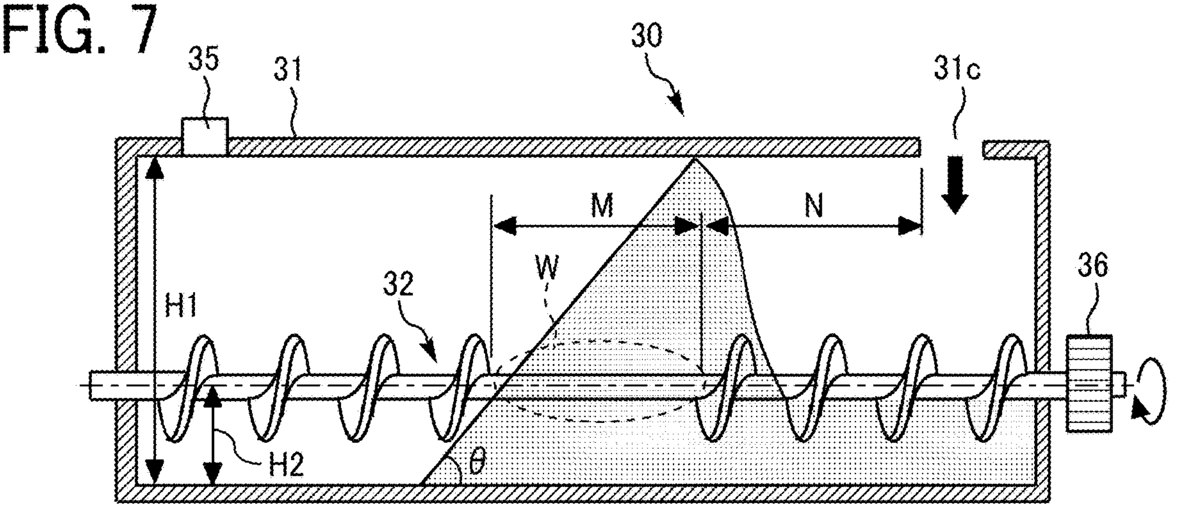
FIG. 7 is a schematic view of the waste-toner collection container in which the waste toner is further collected in the waste-toner collection container of FIG. 6.
Figure 9:
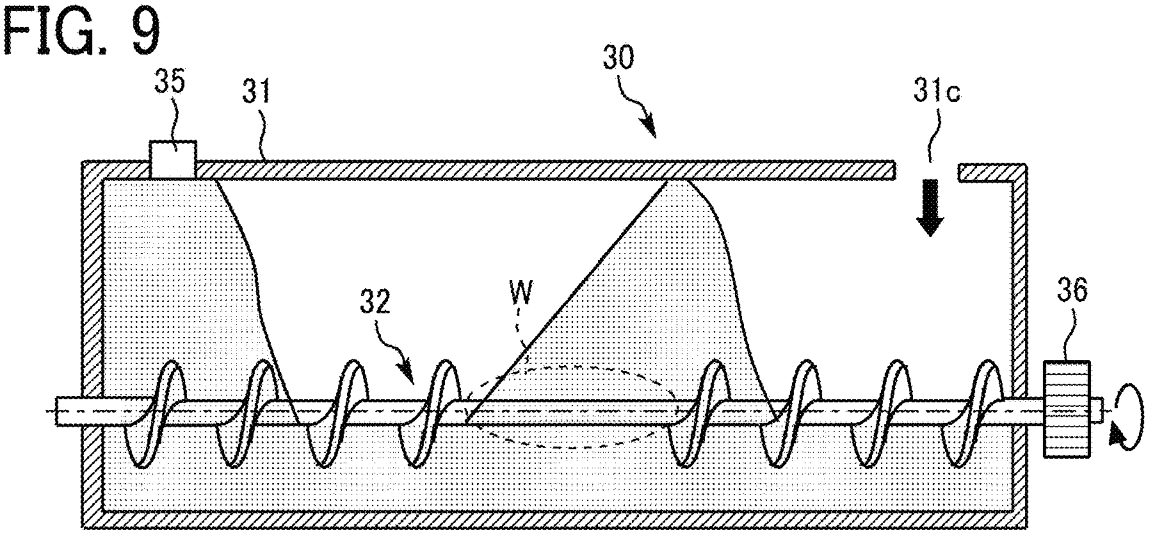
FIG. 9 is a schematic view of the waste-toner collection container in which the waste toner is further collected in the waste-toner collection container of FIG. 8 and the waste-toner collection container is full.

As described above, the non-screw portion W is formed in a part of the conveying screw 32, so that waste toner T is not sequentially and directly conveyed to the end in the axial direction (the end on the downstream side in the conveyance direction) by the conveying screw 32 but forms a buffer portion (which is a pile of waste toner T) at the position of the non-screw portion W as illustrated in FIG. 7. Thereafter, with the buffer portion maintained, the waste toner T is also conveyed to the end in the axial direction (the end on the downstream side in the conveyance direction). Finally, as illustrated in FIG. 9, the full-state detection sensor 35 detects that the container body 31 is in a full state, when a pile of waste toner T that reaches the ceiling surface is formed at each of a position of the end in the axial direction (the end on the downstream side in the conveyance direction) where the full-state detection sensor 35 is disposed and at a position of the non-screw portion W. Accordingly, in a waste-toner collection container 130 (in which a conveying screw 132 having screw portions across the entire area in the axial direction) as a comparative example illustrated in FIG. 10, the full state is detected by the full-state detection sensor 35 when a pile of the waste toner T is formed only at an end in the axial direction. On the other hand, in the present embodiment, a pile of the waste toner T is also formed at a position of the non-screw portion W, and thus, the collection space in the container body 31 is effectively utilized (the collection amount of the waste toner T is increased). That is, waste toner is efficiently collected in a space in the waste-toner collection container 30. In particular, as described above, the conveying screw 32 is disposed at a low position in the container body 31 due to layout constraints in the waste-toner collection container 30 according to the present embodiment. Thus, the configuration of the embodiment of the present disclosure is useful.

In the present embodiment, since the full-state detection sensor 35 is disposed at the upper portion (the ceiling surface in the present embodiment) of the end in the axial direction (the end on the downstream side in the conveyance direction), the full-state detection is performed in a state where a pile of waste toner T that finally reaches the position of the full-state detection sensor 35 is formed. At this time, in a case where a pile of the waste toner T is formed only at the end in the width direction as in the waste-toner collection container 130 as the comparative example illustrated in FIG. 10, a load applied by the waste toner T to the end in the axial direction of the conveying screw 132 is locally greater than a load applied to other portions. Thus, the conveying screw 132 is likely to be twisted in the rotation direction. If the strength of the conveying screw 132 against such twist is insufficient, the conveying screw 132 might be broken before the full state is detected. On the other hand, in the present embodiment, as illustrated in FIG. 9, a pile of the waste toner T is also formed in the non-screw portion W in addition to the end in the width direction. Thus, the conveying screw 132 is less likely to be twisted due to the magnitude of the local load as described above, and a problem such as breakage of the conveying screw 132 is reduced. Note that, in the present embodiment, the full-state detection sensor 35 is disposed on the ceiling surface of the end in the axial direction of the container body 31. The position of the full-state detection sensor 35 is not limited thereto. For example, the full-state detection sensor 35 may also be disposed at a position close to the upper portion of the lateral wall of the container body 31.

Figure 10:
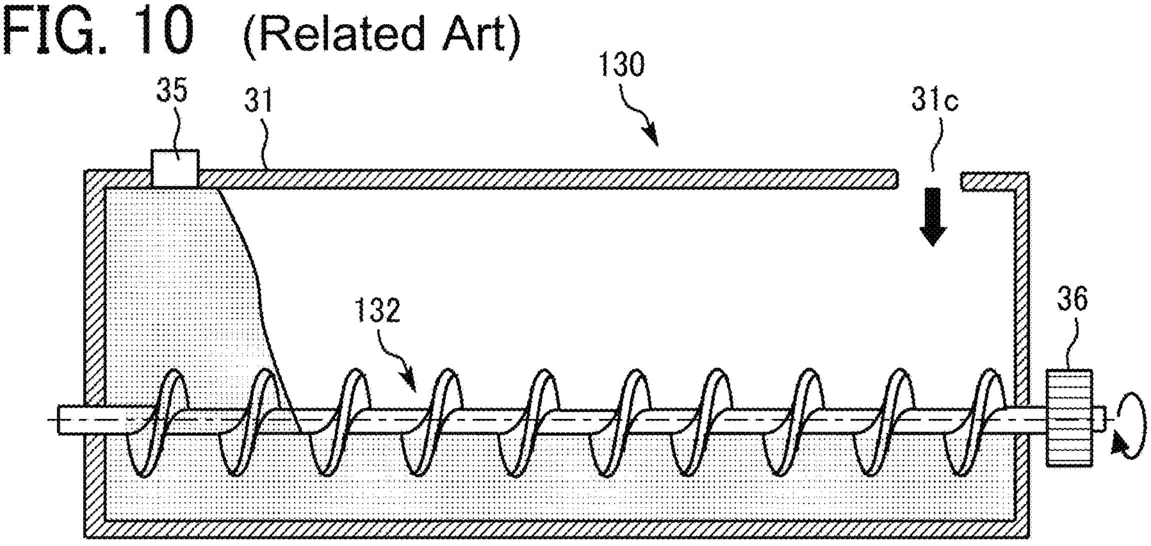
FIG. 10 (Related Art)
FIG. 10 is a schematic view of a waste-toner collection container as a comparative example, in which waste toner is collected in the waste-toner collection container, and the waste-toner collection container is full.

In a case where a pile of the waste toner T is formed only at the end in width direction as in the waste-toner collection container 130 as a comparative example illustrated in FIG. 10, the waste toner T is directly conveyed by the conveying screw 132 toward the pile of the waste toner T. The pile of the waste toner T is pressed against an inner wall at the end in the width direction, and thus an abnormal sound (squeaky sound) is likely to occur and a driving torque of the conveying screw 32 increases. On the other hand, in the present embodiment, as illustrated in FIG. 9, a pile of the waste toner T is also formed in the non-screw portion W in addition to the end in the width direction. Thus, the pile of the waste toner T in the non-screw portion W functions as a buffer, so that a force with which the pile of the waste toner T is pressed against the inner wall of the end in the width direction is relieved. As a result, the above-described abnormal noise is less likely to occur, and the driving torque of the conveying screw 32 is reduced.

With reference to FIGS. 3 and 7, the waste-toner collection container 30 according to the present embodiment is configured such that the following Formula 1 of $(H1-H2)/\tan\theta \leq M$ is established, where H1 is a height from the bottom surface to the ceiling surface in the container body 31, H2 is a height from the bottom surface to a center of the shaft portion 32*a* (rotation center of the conveying screw 32), M is a length in the axial direction of the non-screw portion W (left-right direction in FIGS. 3 and 7), and θ is an angle of repose of waste toner T (powder). Note that the "angle of repose θ" of the waste toner T (powder) is defined as a maximum angle of an inclined surface of a stable pile of waste toner during a process in which the waste toner T (powder) is accumulated without spontaneous collapse of the accumulated pile of waste toner. In other words, when the waste toner T is accumulated to exceed the angle of repose θ, the accumulated pile of waste toner T collapses even if no external force is applied.

With such a configuration in which the above-described Formula 1 is satisfied, in a process in which the collection amount of waste toner T gradually increases and finally reaches a full state in the waste-toner collection container 30, first, as illustrated in FIG. 7, a pile (buffer portion) of waste toner T that reaches the ceiling surface at a position of the non-screw portion W is formed. Then, the waste toner T is conveyed downstream from the non-screw portion W in the conveyance direction while the pile (buffer portion) of waste toner T is maintained. In other words, the length M of the non-screw portion W is set sufficiently to be long, a sufficiently high pile (buffer portion) of waste toner that reaches the ceiling surface can be formed at the position of the non-screw portion W. Accordingly, as illustrated in FIG. 9, the amount of waste toner collected at the time of full-state detection can be eventually increased. In particular, in the waste-toner collection container 30 according to the present embodiment, as described above, the conveying screw 32 is disposed at a low position in the container body 31 due to, for example, layout constraints. However, even in such a case, the amount of waste toner collected at the time of full-state detection can be increased. Note that the waste-toner collection container 30 according to the present embodiment is configured such that a relationship of $H2/H1 \leq 1/2$ is established in the above-described relationship between the heights H1 and H2. In a case where irregularities are formed on the ceiling surface or the bottom surface of the container body 31, the above-described heights H1 and H2 are defined with reference to a lowermost portion of the bottom surface and an uppermost portion of the ceiling surface.

With reference to FIGS. 3 and 7, in the present embodiment, assuming that the distance between an end of the non-screw portion W in the axial direction closer to the collection port 31*c* and an end of the collection port 31*c* in the axial direction closer to the non-screw portion W is N, it is preferable to be configured such that the following Formula 2 of $M \leq N$ is established. With such a configuration, even if the pile of the waste toner T formed at the position of the non-screw portion W forms an inclined surface having an angle of repose θ on the upstream side in the conveyance direction, the distance to the collection port 31*c* is set to be sufficiently long. Thus, the failure that the waste toner T leaks (flows in reverse) to the outside from the collection port 31*c* is reduced. Note that when the conveying screw 32 is provided with a plurality of non-screw portions W, the above-described Formula 2 is a relational formula of the non-screw portion W located on the most upstream side among the plurality of non-screw portions W.

Figure 4:
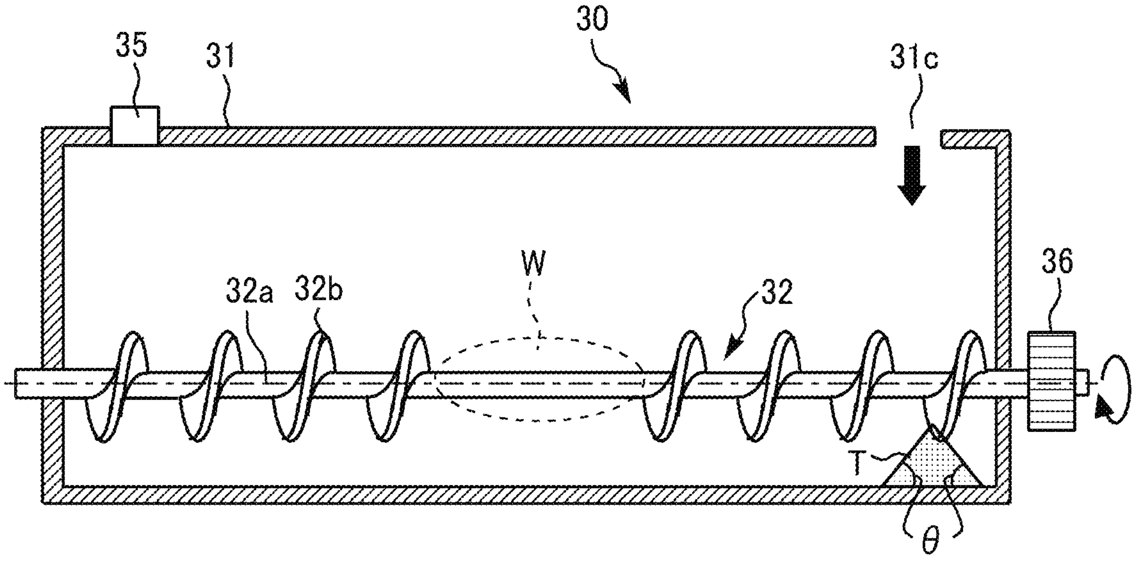
FIG. 4 is a schematic view of the waste-toner collection container in which a small amount of waste toner is collected.
Figure 5:
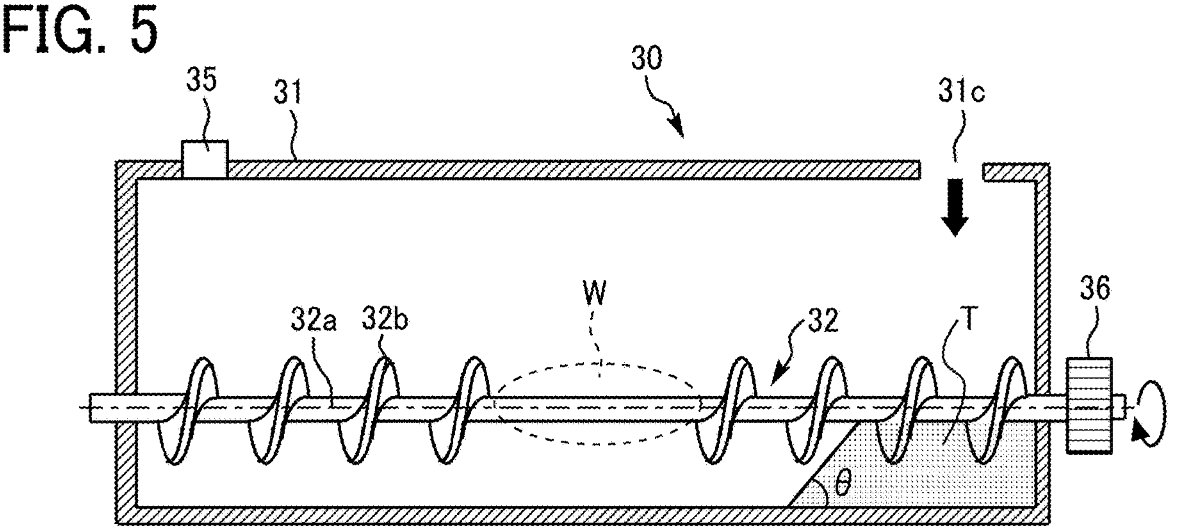
FIG. 5 is a schematic view of the waste-toner collection container in which the waste toner is further collected in the waste-toner collection container of FIG. 4.
Figure 6:
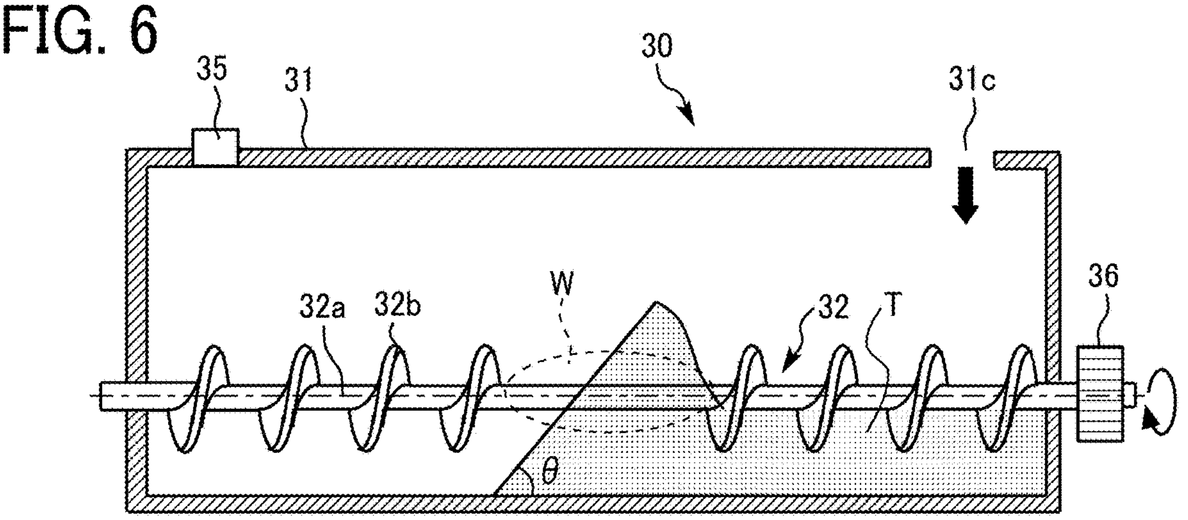
FIG. 6 is a schematic view of the waste-toner collection container in which the waste toner is further collected in the waste-toner collection container of FIG. 5.
Figure 8:
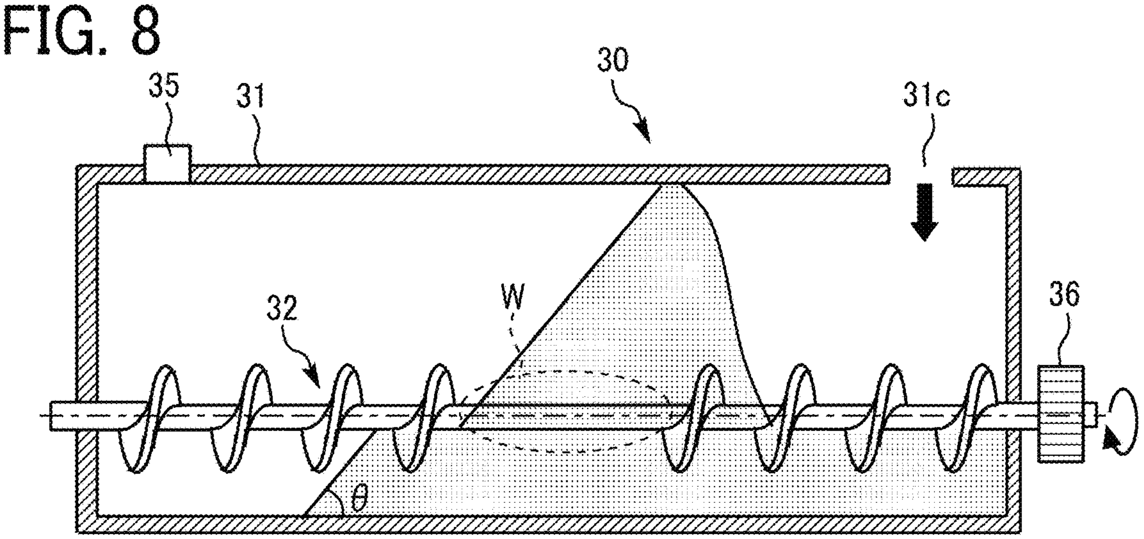
FIG. 8 is a schematic view of the waste-toner collection container in which the waste toner is further collected in the waste-toner collection container of FIG. 7.

With reference to FIGS. 4 to 9, a description is provided below of the behavior of waste toner T from a time when the inflow of waste toner T into the empty waste-toner collection container 30 is started to a time when the waste-toner collection container 30 reaches a full state. When the inflow of waste toner T is started into the empty waste-toner collection container 30, as illustrated in FIG. 4, the waste toner T accumulates in a substantially conical shape with an angle of repose θ immediately below the collection port 31*c*. When the waste toner T continues to flow into the waste-toner collection container 30 and accumulates to the position (substantially the height H2) of the conveying screw 32, as illustrated in FIG. 5, the waste toner T is conveyed toward the left in FIG. 5 by the conveying screw 32 (screw portion 32*b*) while maintaining the angle of repose θ of the downstream end in the conveyance direction. When the waste toner T further continues to flow into the waste-toner collection container 30 and reaches the position of the non-screw portion W, the conveyance of the waste toner T by the screw portion W is not performed at the position. As a result, as illustrated in FIG. 6, the waste toner T forms a pile of the waste toner T to be pushed up by the waste toner T conveyed from the upstream side in a state where the angle of repose θ of the end on the downstream side is maintained. When the waste toner T further continues to flow into the waste-toner collection container 30, as illustrated in FIG. 7, the waste toner T is pushed up by the waste toner T conveyed from the upstream side in a state where the angle of repose θ of the end on the downstream side is maintained, and forms a pile of the waste toner T that reaches the ceiling surface of the container body 31. When the waste toner T further continues to flow into the waste-toner collection container 30, as illustrated in FIG. 8, the waste toner T is pushed up by the waste toner T conveyed from the upstream side while maintaining the pile (buffer portion) of the waste toner T in the non-screw portion W, the waste toner T on the downstream side in the conveyance direction is conveyed to the left in FIG. 8 by the conveying screw 32 (screw portion 32*b*). When the waste toner T further continues to flow into the waste-toner collection container 30, the waste toner T reaches the inner wall of the end in the axial direction (the end on the downstream side in the conveyance direction) in a state where the pile (buffer portion) of the waste toner T in the non-screw portion W is maintained. As illustrated in FIG. 9, a pile of the waste toner T that reaches the ceiling surface of the container body 31 is also eventually formed at the end in the axial direction (the end on the downstream side in the conveyance direction). When the pile of the waste toner T has reached the full-state detection sensor 35, the full-state detection sensor 35 detects that the container body 31 is in a full state.

First Modification

Figure 11:
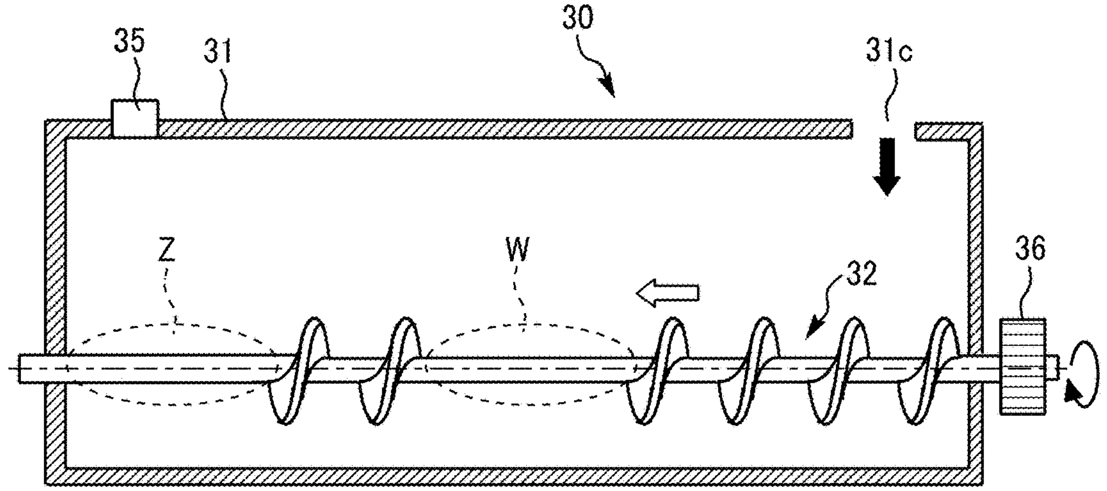
FIG. 11 is a schematic view of a waste-toner collection container as a first modification.

As illustrated in FIG. 11, in a waste-toner collection container 30 according to a first modification, the conveying screw 32 is provided with a second non-screw portion Z around which no screw portion is wound at an end in the axial direction (the end on the downstream side in the conveyance direction). Specifically, in the conveying screw 32 according to the first modification, the second non-screw portions Z is formed at an end in the axial direction in addition to the non-screw portion W (a first non-screw portion) formed at a central portion in the axial direction. The second non-screw portion Z is disposed on the conveying screw 32 in this manner to reduce a force for conveying the waste toner T at the position. Thus, the pile of the waste toner T at the end in the axial direction at the time of full-state detection increases the range in the axial direction as compared with the case illustrated in FIG. 9. As a result, the amount of collected waste toner increases by the extended range. As described above, also in the first modification, the waste toner T can be efficiently collected in a space of the waste-toner collection container 30.

Second Modification

Figure 12:
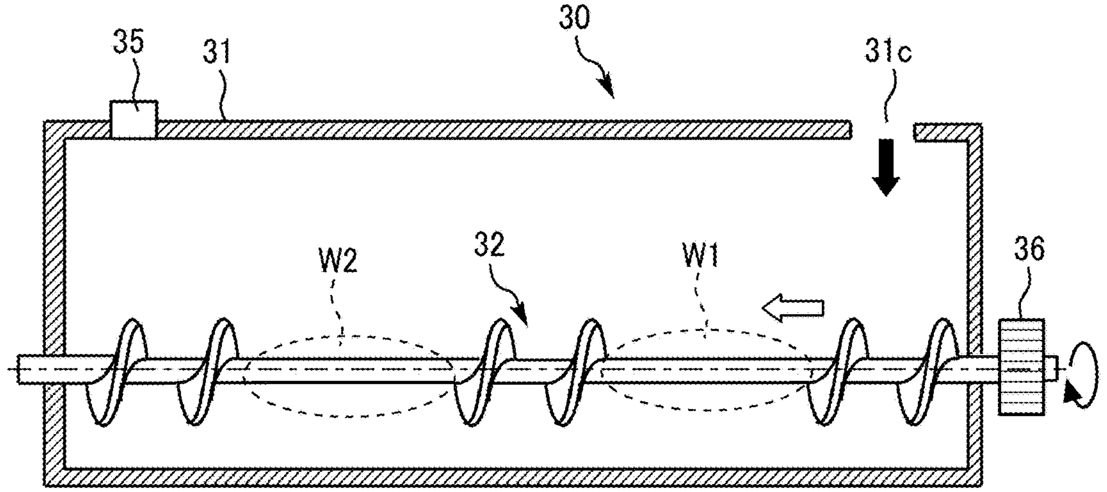
FIG. 12 is a schematic view of a waste-toner collection container as a second modification.

As illustrated in FIG. 12, in a waste-toner collection container 30 according to a second modification, the conveying screw 32 is provided with two non-screw portions W1 and W2, around which the screw portion 32*b* is not wound, at positions of the shaft portion 32*a* between the collection port 31*c* and an end in the axial direction. In the case of such a configuration, since a pile (buffer portion) of the waste toner T can be formed on each of the two non-screw portions W1 and W2, the waste-toner collection amount increases by the two positions. With such a configuration, also in the second modification, the waste toner T can be efficiently collected in a space of the waste-toner collection container 30. Note that also in the second modification, it is preferable to adopt a configuration to satisfy the above-described Formula 1 and Formula 2. In addition, three or more non-screw portions may be provided in the second modification.

Third Modification

Figure 13:
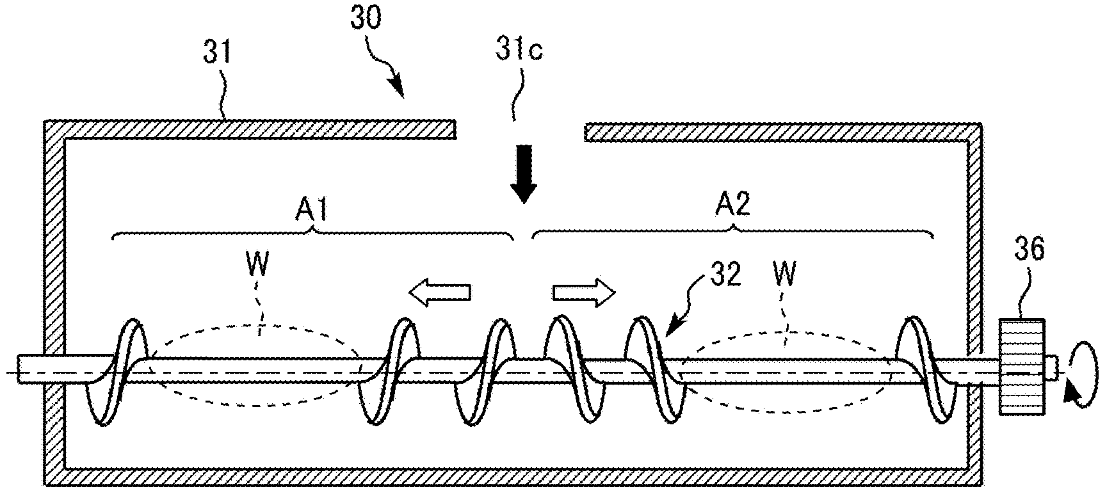
FIG. 13 is a schematic view of a waste-toner collection container as a third modification.

As illustrated in FIG. 13, in a waste-toner collection container 30 according to a third modification, the collection port 31*c* formed in the ceiling surface of the container body 31 is positioned at a central portion in the axial direction rather than the other end in the axial direction (right in FIG. 3) as in the waste-toner collection container 30 of FIG. 3. The conveying screw 32 according to the third modification is formed such that the winding direction of the screw portion 32*b* positioned at one-end side A1 in the axial direction and the winding direction of the screw portion 32*b* positioned at the other-end side A2 in the axial direction are opposite to each other to convey, in a direction indicated by a white arrow, the waste toner T that has flowed into from the collection port 31*c* at the central portion in the axial direction toward each end in the axial direction. That is, the conveying screw 32 is driven to rotate in a specified direction to convey the waste toner T, which has flowed into at the central portion in the axial direction, toward the one-end side A1 and the other-end side A2 in the axial direction. Also in the case of such a configuration, the conveying screw 32 is provided with the non-screw portions W at the one-end side A1 and at the other-end side A2 in the axial direction to efficiently collect the waste toner T in a space in the waste-toner collection container 30. Note that also in the third modification, it is preferable to adopt a configuration to satisfy the above-described Formula 1 and Formula 2. In the third modification, the full-state detection sensor 35 may be disposed on the ceiling surface of the one-end side A1 in the axial direction or on the ceiling surface of the other-end side A2 in the axial direction.

As described above, the waste-toner collection container 30 (powder collection container) according to the present embodiment includes the container body 31 and the conveying screw 32. The waste toner T (powder) that has flowed into from the collection port 31*c* is collected in the container body 31. The conveying screw 32 in which the screw portion 32*b* is wound around the shaft portion 32*a* extending in the axial direction and conveys the waste toner T that has flowed into the container body 31 toward an end in the axial direction. The conveying screw 32 is provided with at least one non-screw portion W, around which no screw portion is wound, at a position in the shaft portion 32*a* between the collection port 31*c* and the end in the axial direction. As a result, the waste toner T is efficiently collected in a space of the waste-toner collection container 30.

In the above-described embodiments, the present disclosure is applied to the image forming apparatus 100 in which the untransferred toner collected in each of the plurality of cleaning devices 2Y, 2M, 2C, 2K, and 16 is conveyed toward the waste-toner collection container 30 via the waste-toner conveyor 40 (toner conveyance passage). However, the present disclosure is not limited to the above-described embodiments. The present disclosure can readily be applied to, for example, an image forming apparatus in which untransferred toner collected in a single cleaning device is conveyed toward a waste-toner collection container via a toner conveyance passage. In the above-described embodiments, the present disclosure is applied to the waste-toner collection container 30 as a powder collection container in which the waste toner as powder is collected. However, the present disclosure is not limited to the above-described embodiments. The present disclosure can be applied to all powder collection devices (for example, a powder collection device in which two-component developer containing toner and carrier as powder is collected). Such cases also provide substantially the same effects as the effects described above.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, the number, position, shape, and so forth of components are not limited to those of the present embodiment and variations, and may be the number, position, shape, and so forth that are suitable for implementing the present disclosure.

Note that aspects of the present disclosure may be, for example, combinations of first to tenth aspects as follows.

First Aspect

In a first aspect, a powder collection container (e.g., the waste-toner collection container 30) includes a container body (e.g., the container body 31) and a conveying screw (e.g., the conveying screw 32). Powder that has flowed from a collection port (e.g., the collection port 31*c*) is collected in the container body (e.g., the container body 31). The conveying screw (e.g., the conveying screw 32) has a shaft portion (e.g., the shaft portion 32*a*) extending in an axial direction of the conveying screw and a screw portion (e.g., the screw portion 32*b*) wound around the shaft portion and is driven to rotate in a specified direction to convey the powder, which has flowed into the container body (e.g., the container body 31), toward an end of the conveying screw (e.g., the conveying screw 32) in the axial direction. The conveying screw (e.g., the conveying screw 32) has at least one non-screw portion (e.g., the non-screw portion W) around which no screw portion is wound at a position of the shaft portion (e.g., the shaft portion 32*a*) between the collection port (e.g., the collection port 31*c*) and the end of the conveying screw (e.g., the conveying screw 32) in the axial direction.

Second Aspect

In a second aspect, in the powder collection container (e.g., the waste-toner collection container 30) according to the first aspect, a relationship of $(H1-H2)/\tan\theta \leq M$ is established, where H1 is a height from a bottom surface to a ceiling surface in the container body (e.g., the container body 31), H2 is a height from the bottom surface to a center of the shaft portion (e.g., the shaft portion 32*a*), M is a length of the non-screw portion (e.g., the non-screw portion W) in the axial direction, and θ is an angle of repose of the powder.

Third Aspect

In a third aspect, in the powder collection container (e.g., the waste-toner collection container 30) according to the second aspect, a relationship of $M \leq N$ is established, where N is a distance between an end of the non-screw portion (e.g., the non-screw portion W) in the axial direction adjacent to the collection port (e.g., the collection port 31*c*) and an end of the collection port (e.g., the collection port 31*c*) in the axial direction adjacent to the non-screw portion (e.g., the non-screw portion W).

Fourth Aspect

In a fourth aspect, in the powder collection container (e.g., the waste-toner collection container 30) according to any one of the first to third aspects, the conveying screw (e.g., the conveying screw 32) includes a second non-screw portion (e.g., the second non-screw portion Z) around which no screw portion is wound at the end of the conveying screw (e.g., the conveying screw 32) in the axial direction.

Fifth Aspect

In a fifth aspect, in the powder collection container (e.g., the waste-toner collection container 30) according to any one of the first to fourth aspects, the end of the conveying screw (e.g., the conveying screw 32) in the axial direction is disposed at one end of the container body (e.g., the container body 31) in the axial direction. The collection port (e.g., the collection port 31*c*) is formed at an upper portion of the other end of the container body (e.g., the container body 31) opposite the one end of the container body.

Sixth Aspect

In a sixth aspect, in the powder collection container (e.g., the waste-toner collection container 30) according to any one of the first to fifth aspects, the powder collection container (e.g., the waste-toner collection container 30) is a waste-toner collection container to collect waste toner as powder.

Seventh Aspect

In a seventh aspect, an image forming apparatus (e.g., the image forming apparatus 100) includes the powder collection container (e.g., the waste-toner collection container 30) according to any one of the first to sixth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A powder collection container, comprising:

a container body including a collection port from which powder is to flows into the container body; and a conveying screw including:

a shaft portion extending in an axial direction of the conveying screw; and a screw portion wound around the shaft portion, the conveying screw to rotate in a specified direction to convey the powder, which has flowed into the container body, toward an end of the conveying screw in the axial direction, the conveying screw including a non-screw portion around which no screw portion is wound at a sition of the shaft portion between the collection port and the end of the conveying screw in the axial direction, wherein a relationship of $(H1-H2)/\tan\theta < M$ is established, where H1 is a height from a bottom surface to a ceiling surface in the container body, H2 is a height from the bottom surface to a center of the shaft portion, M is a length of the non-screw portion in the axial direction, and θ is an angle of repose of the powder.

2. The powder collection container according to claim 1, wherein a relationship of M≤N is established, where N is a distance between an end of the non-screw portion in the axial direction adjacent to the collection port and an end of the collection port in the axial direction adjacent to the non-screw portion.

3. The powder collection container according to claim 1, wherein the conveying screw includes another non-screw portion around which no screw portion is wound at the end of the conveying screw in the axial direction.

4. The powder collection container according to claim 1, wherein the end of the conveying screw in the axial direction is at one end of the powder collection container in the axial direction, and the collection port is at an upper portion of the other end of the container body opposite the end of the container body in the axial direction.

5. The powder collection container according to claim 1, wherein the powder collection container is a waste-toner collection container to collect waste toner as the powder.

6. An image forming apparatus, comprising the powder collection container according to claim 1.

* * * * *